United States Patent
Koren et al.

(10) Patent No.: US 11,010,658 B2
(45) Date of Patent: May 18, 2021

(54) SYSTEM AND METHOD FOR LEARNING THE STRUCTURE OF DEEP CONVOLUTIONAL NEURAL NETWORKS

(71) Applicant: Intel Corporation, Santa Clara, CA (US)

(72) Inventors: Guy Koren, Haifa (IL); Raanan Yonatan Yehezkel Rohekar, Tel Aviv (IL); Shami Nisimov, Newe-Ziv (IL); Gal Novik, Haifa (IL)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 15/853,403

(22) Filed: Dec. 22, 2017

(65) Prior Publication Data

US 2019/0042911 A1    Feb. 7, 2019

(51) Int. Cl.
*G06N 3/04*    (2006.01)
*G06N 3/08*    (2006.01)
*G06N 7/00*    (2006.01)

(52) U.S. Cl.
CPC ............. *G06N 3/04* (2013.01); *G06N 3/0454* (2013.01); *G06N 3/082* (2013.01); *G06N 7/005* (2013.01)

(58) Field of Classification Search
CPC ........ G06N 3/04; G06N 3/0454; G06N 3/082; G06N 7/005
See application file for complete search history.

(56) References Cited

U.S. PATENT DOCUMENTS

2018/0322419 A1* 11/2018 Bugenhagen .......... G06N 5/043
2019/0156184 A1*  5/2019 Le ........................... G06F 9/454

FOREIGN PATENT DOCUMENTS

KR        101942173 B1  *  4/2019

OTHER PUBLICATIONS

Yehezkel, Raanan, and Boaz Lerner. "Bayesian Network Structure Learning by Recursive Autonomy Identification." Journal of Machine Learning Research 10, No. 7 (2009). (Year: 2009).*
Liu, Mengchen, Jiaxin Shi, Zhen Li, Chongxuan Li, Jun Zhu, and Shixia Liu. "Towards better analysis of deep convolutional neural networks." IEEE transactions on visualization and computer graphics 23, No. 1 (2016): 91-100. (Year: 2016).*

(Continued)

*Primary Examiner* — Amir Mehrmanesh
*Assistant Examiner* — Sami A Al-Dhaheri
(74) *Attorney, Agent, or Firm* — Schwegman Lundberg & Woessner, P.A.

(57) ABSTRACT

A recursive method and apparatus produce a deep convolution neural network (CNN). The method iteratively processes an input directed acyclic graph (DAG) representing an initial CNN, a set of nodes, a set of exogenous nodes, and a resolution based on the CNN. An iteration for a node may include recursively performing the iteration upon each node in a descendant node set to create a descendant DAG, and upon each node in ancestor node sets to create ancestor DAGs, the ancestor node sets being a remainder of nodes in the temporary DAG after removing nodes of the descendent node set. The descendant and ancestor DAGs are merged, and a latent layer is created that includes a latent node for each ancestor node set. Each latent node is set to be a parent of sets of parentless nodes in a combined descendant DAG and ancestors DAGs before returning.

24 Claims, 6 Drawing Sheets

```
                                                           ⎽300
305 ⎯ Input: X: observed nodes, and Indep: an oracle for testing statistical independence.
310 ⎯ Output: G, a latent structure over X and H
315 ⎯ initialize G_X ⟵ a complete graph over X
320 ⎯ begin                                     ╱327
  325 ⎯ foreach pair of connected nodes X_i, X_j in G_X if Indep(X_i, X_j)  ▷ find independencies
       do
    330 ⎯   disconnect X_i and X_j
    335 ⎯   direct edges X_i → X_c ← X_j for every common neighbor X_c 340 ⎯ X_D ⟵ nodes having the lowest topological order       ▷ identify autonomous sets
  345 ⎯ {X_{A_i}}_{i=1}^K ⟵ disjoint sets, after removing X_D from G_X
  350 ⎯ G ⟵ an empty graph over X
  355 ⎯ add K latent variables H = {H_i}_{i=1}^K to G          ▷ create a latent layer
  360 ⎯ set each H_i to be a parent of {X_{A_i} ∪ X_D}         ▷ connect
  365 ⎯ return G
```

(56) References Cited

OTHER PUBLICATIONS

Colombo, Diego, Marloes H. Maathuis, Markus Kalisch, and Thomas S. Richardson. "Learning high-dimensional directed acyclic graphs with latent and selection variables." The Annals of Statistics (2012): 294-321. (Year: 2012).*

"5.4.4—Conditional Independence", Stat 504—Analysis of Discrete Data, [Online]. [Accessed Nov. 12, 2017]. Retrieved from the Internet: <URL:https://onlinecourses.science.psu.edu/stat504/node112, 5 pgs.

"Directed acyclic graph", Wikipedia, [Online].Accessed Nov. 11, 2017, Retrieved from the Internet: URL:<http://en.wikipedia.org/w/index.php?title=Directed_acyclic_graph&oldid=211076921>, 7 pgs.

"Convolutional neural network", Wikipedia, (Accessed Oct. 7, 2017), 14 pgs.

"Unsupervised Deep Structure Learning by Recursive Dependency Analysis", ICLR 2018, (Accessed Nov. 11, 2017), 15 pgs.

* cited by examiner

305 — Input: $X$: observed nodes, and Indep: an oracle for testing statistical independence.
310 — Output: $\mathcal{G}$, a latent structure over $X$ and $H$
315 — *Initialize $\mathcal{G}_X \leftarrow$ a complete graph over $X$*
320 — begin
325 — foreach *pair of connected nodes $X_i, X_j$ in $\mathcal{G}_X$ if* Indep$(X_i, X_j)$ ⊳ find independencies ⟵ 327
     do
330 — ⎾ disconnect $X_i$ and $X_j$
335 — ⎿ direct edges $X_i \rightarrow X_c \leftarrow X_j$ for every common neighbor $X_c$
340 — $X_D \leftarrow$ nodes having the lowest topological order
345 — $\{X_{A_i}\}_{i=1}^{K} \leftarrow$ disjoint sets, after removing $X_D$ from $\mathcal{G}_X$ ⊳ identify autonomous sets
350 — $\mathcal{G} \leftarrow$ an empty graph over $X$
355 — add $K$ latent variables $H = \{H_i\}_{i=1}^{K}$ to $\mathcal{G}$ ⊳ create a latent layer
360 — set each $H_i$ to be a parent of $\{X_{A_i} \cup X_D\}$ ⊳ connect
365 — return $\mathcal{G}$

*FIG. 3*

RecurLatStruct ($\mathcal{G}_X, X, X_{ex}, n$)
Input: an initial DAG $\mathcal{G}_X$ over observed $X$ & exogenous nodes $X_{ex}$ and a desired resolution $n$.
Output: $\mathcal{G}$, a latent structure over $X$ and $H$ if *the maximal indegree of $\mathcal{G}_X(X)$ is below $n+1$* then   ▷ exit condition
   $\mathcal{G} \leftarrow$ an observed layer $X$
   return $\mathcal{G}$ $\mathcal{G}'_X \leftarrow$ IncreaseResolution($\mathcal{G}_X, n$)   ▷ $n$-th order independencies
$\{X_D, X_{A1}, \ldots, X_{AK}\} \leftarrow$ SplitAutonomous($X, \mathcal{G}'_X$)   ▷ identify autonomies
for $i \in \{1 \ldots K\}$ do
   $\mathcal{G}_{A_i} \leftarrow$ RecurLatStruct($\mathcal{G}'_X, X_{A_i}, X_{ex}, n+1$)   ▷ a recursive call
$\mathcal{G}_D \leftarrow$ RecurLatStruct($\mathcal{G}'_X, X_D, X_{ex} \cup \{X_{A_i}\}_{i=1}^K, n+1$)   ▷ a recursive call
$\mathcal{G} \leftarrow$ Group($\mathcal{G}_D, \mathcal{G}_{A1}, \ldots, \mathcal{G}_{AK}$)   ▷ merge results
create latent variables $H^{(n)} = \{H_1^{(n)}, \ldots, H_K^{(n)}\}$ in $\mathcal{G}$   ▷ create a latent layer
set each $H_i^{(n)}$ to be a parent of $\{H_{A_i}^{(n+1)} \cup H_D^{(n+1)}\}$   ▷ connect
where $H_{A_i}^{(n+1)}$ and $H_D^{(n+1)}$ are the sets of parentless latents in $\mathcal{G}_{A_i}$ and $\mathcal{G}_D$, respectively.

return $\mathcal{G}$

*FIG. 4*

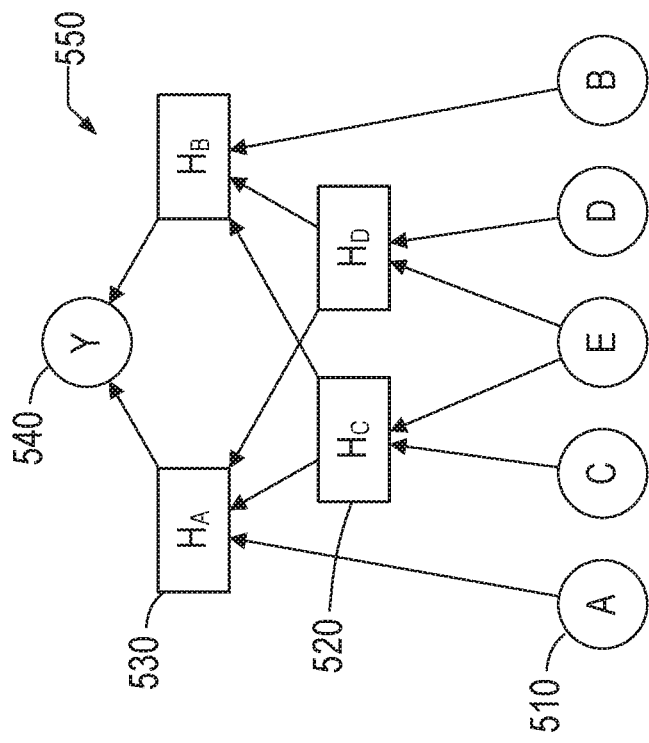
*FIG. 5C*
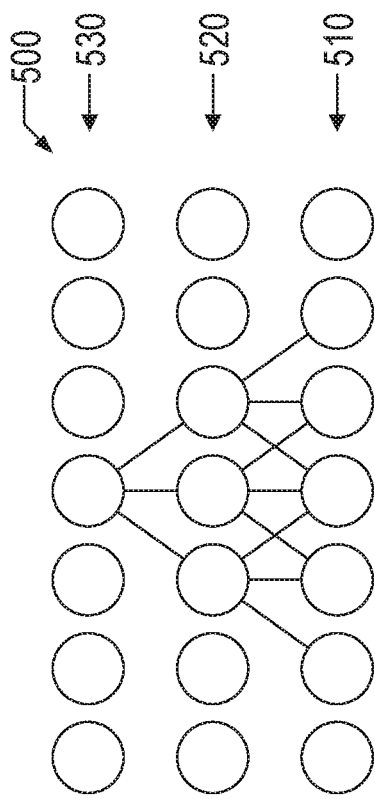
*FIG. 5A*
*FIG. 5B*

SYSTEM AND METHOD FOR LEARNING THE STRUCTURE OF DEEP CONVOLUTIONAL NEURAL NETWORKS

TECHNICAL FIELD

Described herein are systems, methods, and apparatuses for learning the structure of deep convolutional neural networks.

BACKGROUND

Neural networks are computing systems that learn to do tasks without task-specific programming. They are comprised of neurons that may process and transmit a signal to another neuron, with the neurons being organized into layers, where different layers perform different types of transformations on their inputs.

Convolutional neural networks (CNNs) are a class of deep, feed-forward neural networks that are applied in the field of imaging (e.g., image recognition), sound processing (e.g., speech recognition), and similar fields. A convolutional layer in a CNN applies a convolution operation to its input and passes the result to the next layer. In general, CNNs use relatively little pre-processing, meaning that the network learns the filters that are hand engineered in traditional algorithms, making them more independent from prior knowledge and human effort in feature design.

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which:

FIG. 3 is a pseudo-code listing of an example implementation of a process for learning the LDPGM structure from data for a single latent layer;

FIG. 4 is a pseudo-code listing of an example implementation of a recursive process for learning the LDPGM structure from data for layers;

FIG. 5A is a block diagram illustrating node relationships in layers;

FIG. 5B is a block diagram of an example of a deep generative model;

FIG. 5C is a block diagram illustrating a discriminating model created based on the deep generative mode.

DETAILED DESCRIPTION

Figure 1:
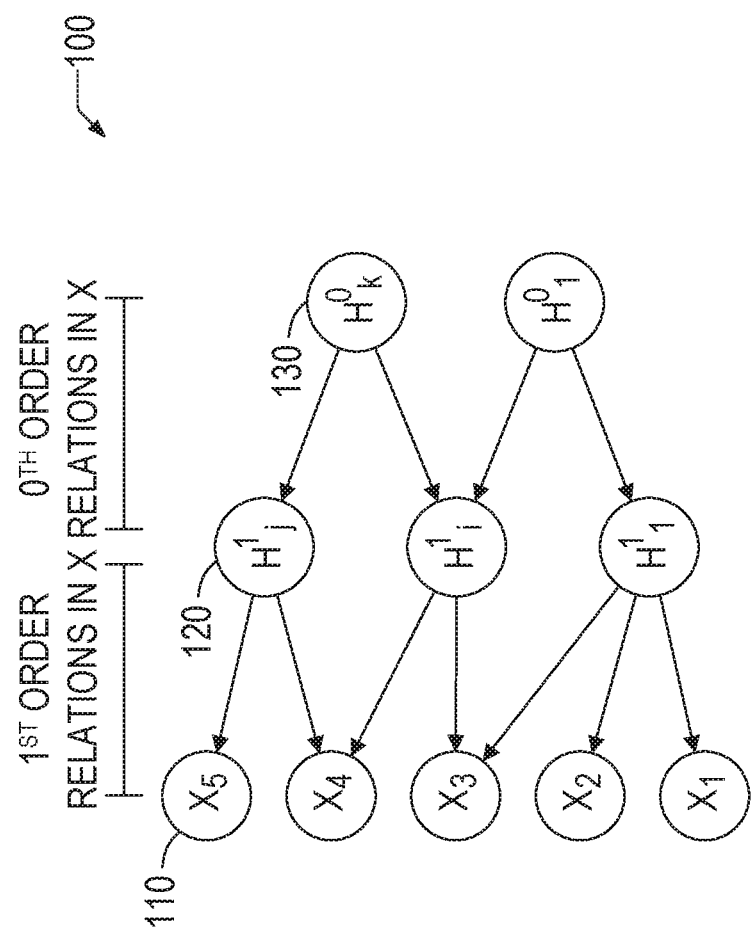
FIG. 1 is a block diagram that illustrates a learned deep probabilistic generative model (LDPGM), according to an implementation.

In the following description, for purposes of explanation, numerous specific details are set forth in order to provide a thorough understanding of some example implementations. It will be evident, however, to one skilled in the art that the present disclosure may be practiced without these specific details.

Over the last decade, deep neural networks have proven their effectiveness in solving many challenging problems in various domains such as speech recognition, computer vision, and machine translation. As compute resources became more available, large scale models having millions of parameters could be trained on massive volumes of data, to achieve state-of-the-art solutions for these high dimensionality problems. Building these models requires various design choices such as network topology, cost function, optimization technique, and the configuration of related hyper-parameters.

This disclosure addresses the design of network topology, particularly neural net structure learning, for neural net processors that may be used in various devices. Generally, exploration of the design space of structural learning is a time consuming iterative process that requires close supervision by a human expert. Present methods for learning or identifying an optimal structure of a CNN from data are not as efficient as they could be. Commonly, the CNN structure is built "by hand", that is, by trial-and-error in a time-consuming procedure. Alternatively, another approach to learning the structure of an optimal CNN is to use common topologies, which are generally sub-optimal since they require redundant computation. Such methods search the space of all possible structures using reinforcement learning or evolutionary algorithms. These methods may require massive amounts of computation (e.g., several hundreds of graphical processing unit (GPU) cards). They require a large amount of labeled data (e.g., supervised learning), which, in many practical and commercial applications is unfeasible (e.g., unlabeled data is easier to obtain).

The compute-complexity of the resulting structure cannot be directly chosen—these methods output a single structure with arbitrary complexity, and the resulting structure does not necessarily have a "fit" to any desired hardware. Moreover, it is not clear how hardware constraints for the resulting structure may be incorporated. Due to their resource demanding nature, the structures generated by present methods are not guaranteed to identify the optimal network by any criterion and simply converge to a local optimum.

Various studies provide guidelines for design choices such as network depth, layer width, building blocks, and connectivity. Based on these guidelines, these studies propose several meta-architectures, trained on huge volumes of data. These meta-architectures were applied to other tasks by leveraging the representational power of their convolutional layers and fine-tuning their deepest layers for the task at hand. However, these meta-architectures may be unnecessarily large and require large computational power and memory for training and inference.

The problem of model structure learning has been widely researched for many years in the probabilistic graphical models domain, specifically, Bayesian networks for density estimation and causal discovery. Two main approaches were studied: score-based (e.g., search-and-score) and constraint-based. Score-based approaches combine a scoring function, such as Bayesian Dirichlet likelihood-equivalence (BDe) and Bayesian information criterion (BIC), with a strategy for searching through the space of structures, such as greedy equivalence search. An algorithm has also been introduced for sampling deep belief networks (generative model) and demonstrated its applicability to high-dimensional image datasets.

Constraint-based approaches find the optimal structures in the large sample limit by testing conditional independence (CI) between pairs of variables. They are generally faster than score-based approaches and have a well-defined stopping criterion (e.g., maximal order of conditional independence). However, these methods are sensitive to errors in the independence tests, especially in the case of high-order conditional-independence tests and small training sets.

This disclosure provides a new mechanism for creating depth and inter-layer connectivity in deep neural networks. A structure learning algorithm is provided such that a hierarchy of independencies in the input distribution is encoded in the network structure, where the first layers encode higher-order independencies than deeper layers. Thus, the number of layers may automatically be determined. Moreover, a neuron in a layer is allowed to connect to neurons in deeper layers, skipping intermediate layers.

The system and methods described herein may learn a deep CNN's structure in a principled manner (e.g., based on a sound mathematical background), and identify the optimal solution under certain probabilistic assumptions. The overall procedure, according to an implementation, is that, first, the input neurons (e.g., image pixels) are convolved with n pre-defined filters (e.g., Gabor, random projections, or the first few layers of a pre-trained NN) resulting in n output feature maps (OFM/channel). Then, each channel is treated as a random variable $X_i$ (i in 1 . . . n). A probabilistic graphical-model structure is then learned such that each channel (filter) is a node. A recursive process merges results from convolutional layers when constructing the structure, using a conditional independence test for input images. Hidden (or latent) layers are constructed and the interconnections between the nodes of the hidden layers are determined based on a conditional independence test. Ultimately, this structure may be converted into an optimized deep CNN that has sparse inter-layer, inter-filter, connectivity.

FIG. 1 is a block diagram that illustrates a learned deep probabilistic generative model (LDPGM) that may run on a neural net processor. The neural net processor is a processor that is based on a collection of connected units or nodes called "artificial neurons", and in which each connection (synapse) between neurons may transmit a signal from one to another. A receiving (postsynaptic) neuron may process the signal(s) and then signal downstream neurons connected to it. In common neural network implementations, the synapse signal may be a real number, and the output of each neuron may be calculated by a non-linear function of the sum of its input. Neurons and synapses may also have a weight that varies as learning proceeds, which can increase or decrease the strength of the signal that it sends downstream. Further, they may have a threshold such that only if the aggregate signal is below (or above) that level is the downstream signal sent. Typically, neurons are organized in layers. Different layers may perform different kinds of transformations on their inputs. Signals travel from the first (input), to the last (output) layer, possibly after traversing the layers multiple times.

The LDPGM may typically have a large number of hidden layers, although only two hidden layers 120, 130 are illustrated for the sake of simplicity. In FIG. 1, $X=(X_1, \ldots, X_5)$ is an example of a five-channel input image (each $X_n$ may be referred to herein as an input image, even though it may be simply a channel of an overall image) in which each channel is a random variable $X_n$. The arrow direction in the FIGS. may depend on whether they indicate a generative or a discriminative model. The hidden layers are generally those layers between the input layer and the output layer.

Learning the structure of the LDPGM as described herein involves treating each of the n-channels as a random variable $(X_1 \ldots X_n)$ 110. The method learns a deep probabilistic graphical model (e.g., a deep Bayesian/belief network) to represent inter-dimension relations. In FIG. 1, the deepest layer 130 represents $0^{th}$ order relations (pair-wise relations $\{X_i-X_j\}$), the second deepest layer 120 represents $1^{st}$ order relations (pair-wise relations conditioned on one variable $\{X_i-X_j|X_k\}$). If more layers were present, this representation would continue until the layer connected to the input 110 that represents the highest order relations. In FIG. 1, $H^q_i$ represents a hidden random variable at the $q^{th}$ layer representing $q^{th}$ order pair-wise relations among X. The graphical models may either be generative (i.e., when generating the graphical model, such as is shown in FIG. 5B) or discriminative (i.e., when using the model to discriminate new inputs, such as is shown in FIG. 5C), but the learning is done with regard to a generative model.

Figure 2:
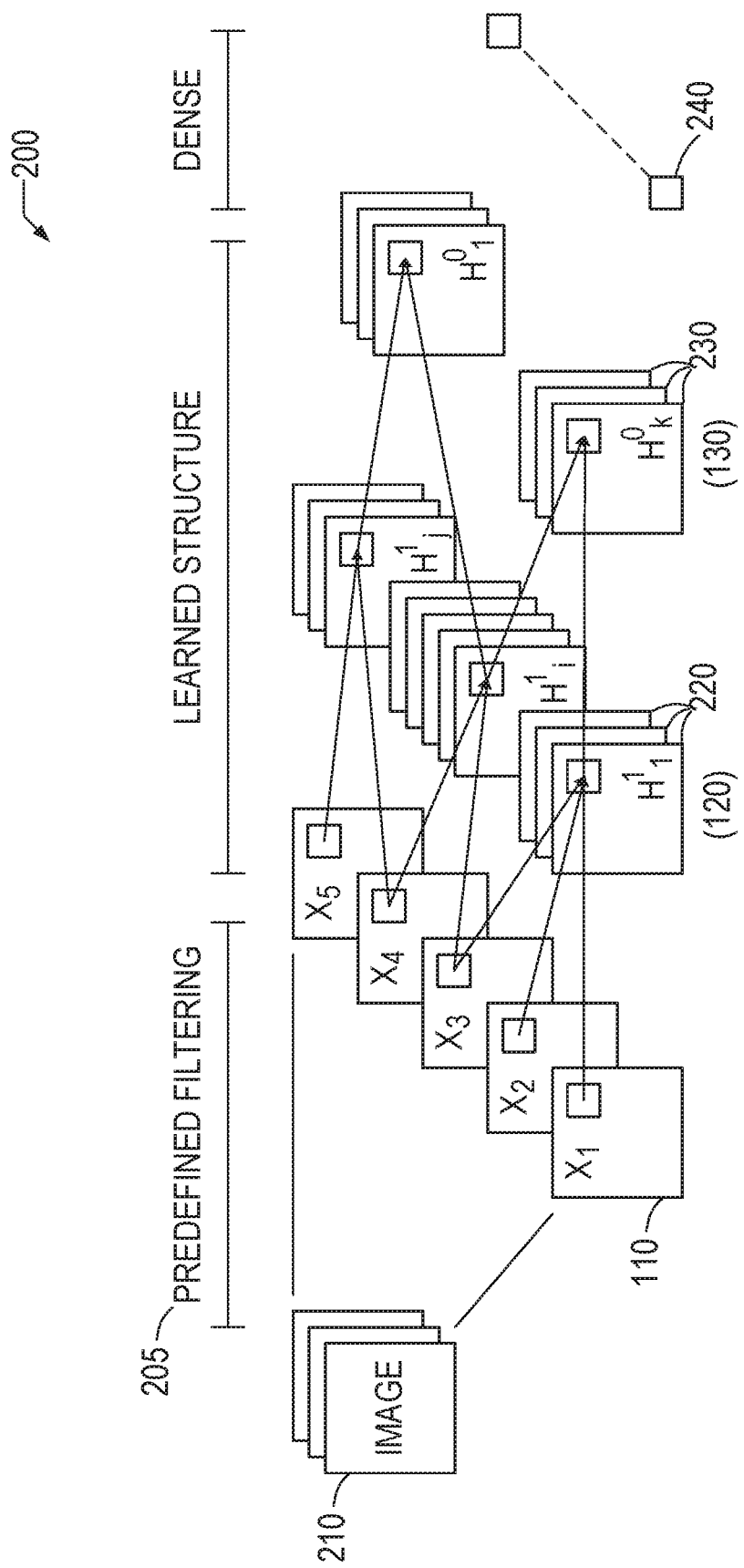
FIG. 2 is a block flow diagram that illustrates an example process of learning the structure of the CNN 200 by mapping the LDPGM of FIG. 1, according to an implementation.

In order to convert the learned deep probabilistic graphical (LDPGM) model shown in FIG. 1 into a deep CNN, the LDPGM is converted into a deep discriminative model by inverting the edge directions (switching the arrow directions, from pointing from the deepest layers towards the input layer as in FIG. 1 to pointing from the input layer to the deepest layers as shown in FIG. 2—also shown in FIGS. 5B and 5C). Next, each hidden variable $H^q_i$ 120, 130 in the discriminative probabilistic model is replaced by a set of convolution kernels (channels) 220, 230.

FIG. 2 is a block flow diagram that illustrates an example process of learning the structure of the CNN 200 by mapping the LDPGM of FIG. 1. The predefined filtering 205, which is a fixed part of the process, takes the input images 210, used as an example input, and converts them into image channels 110 (also referred to as images or feature maps herein). The example image 210 may comprise red, green, and blue (RGB) components. The image 210 data is similar to data that is used for training the neural network, but in this operation (learning the structure), the data is used to learn the structure of the neural network before learning the parameters of the neural network.

The predefined filtering 205 projects the input (e.g., three channels of the image: red, green, blue—the RGB image 210) into a high dimensional space (e.g., the five multiple channels—input layer X 110). This may be done by convolving the input image 210 with n pre-defined kernels (filters) $(X_n$ 110), resulting in n channels. FIG. 2 illustrates n=5, with five pre-defined filters 110 (although typically for image processing, there may be many more). This convolving may be performed using various efficient and mathematically sound traditional convolution approaches using predefined filters, such as random projections or Gabor filtering. The first few layers of a CNN may be trained on a large generic data set (e.g., images from the web or ImageNet). The result is an n-dimensional image. The input layer X 110 is created by convolving the input RGB image 210 with multiple kernels (e.g., using the Gabor technique) and the deepest convolution layer 130 is connected to a classification layer (e.g., using a softmax function). Next, the learning process is performed to create the LDPGM from the input data, here the image data 210. Finally, the neural network parameters are learned in a supervised manner using any common optimization method (e.g., stochastic gradient descent).

In designs similar to that shown in FIG. 2, the layer 230 next to the dense (fully connected) layer 240 is connected to the previous layer such that every filter is connected to all filters in the previous layer. However, in the current design, as shown in FIG. 2, the layer 230 next to the dense layer 240 is only connected to a small subset of the filters in the previous layer 220. Each of the $H^0_1$ to $H^0_k$ nodes are independently connected to a different subset of the previous layer's nodes, i.e., a different subset of the filters of the featured maps. As noted herein, connections may skip over layers as well. The idea is that there is no need for a connection that consumes computational and memory resources if there is no dependency (correlation) between two nodes, and thus, when such a connection is determined to exist, it is removed. The learning process takes the data input 210 and calculates conditional independencies between the output feature maps (pairs of filters, e.g., $X_1$ and $X_2$).

As a basis, consider $X=\{X_i\}_{i=1}^N$ a set of observed (input) random variables, $H=\{H_j\}_{j=1}^K$ a set of latent variables, and Y a class variable. The process constructs three graphical models and an auxiliary graph. Each variable is represented by a single node and a single edge may connect two distinct nodes. The graph $\mathcal{G}$ is a generative directed acyclic graph (DAG) defined over the observed and latent variables X∪H. Graph $\mathcal{G}_{inv}$ is called a stochastic inverse of $\mathcal{G}$. Graph $\mathcal{G}_D$ is a discriminative model defined over the observed, latent, and class variables X∪H∪Y. An auxiliary graph $\mathcal{G}_X$ is defined over X (a completed partially DAG (CPDAG); an equivalence class of a Bayesian network) and is generated and maintained as an internal state. The parents' set of a node X in $\mathcal{G}$ is denoted Pa(X; $\mathcal{G}$). The order of an independence relation is defined to be the condition set size. For example, if $X_1$ and $X_2$ are independent given $X_3$ and $X_4$, denoted $X_1 \perp\!\!\!\perp X_2 | \{X_3, X_4\}$, then the independence order is two.

An example of a structure learned by the technique may be one that is used for classifying Modified National Institute of Standards and Technology (MNIST) digits). Neurons in a layer may connect to neurons in any deeper layer. Depth may be determined automatically. Each gather layer (a layer that combines preceding layers) selects a subset of the input, where each input variable is gathered only once. A neural route, starting with a gather layer, passes through densely connected layers where it may split (e.g., copy) and merge (e.g., concatenate) with other routes in correspondence with the hierarchy of independencies identified. All routes merge into the final output layer (e.g., a softmax layer).

An input joint distribution p(X) is assumed to comply with the following property:

The joint distribution p(X) is faithful to a DAG $\mathcal{G}$ over observed X and latent nodes H, where for all X∈X and H∈H, Pa(X;)⊆H and Pa(H; G)⊆H\H.

$$p(X; G) = \int p(X, H; G)dH$$
$$= \int p(H) \prod_{i=1}^{N} p(X_i | Pa(X_i; G))dH$$

The generative graphical model $\mathcal{G}$ may be described as a layered deep belief network where parents of a node in layer m may be in any deeper layer, indexes greater than m, and not restricted to the next (i.e., adjacent) layer m+1. This differs from the common definition of deep belief networks where the parents are restricted to layer m+1.

It is desired to learn an efficient graph $\mathcal{G}$ having small sets of parents and a simple factorization of p(H) while maintaining high expressive power. To accomplish this, an auxiliary graph is first constructed—a CPDAG, $\mathcal{G}_X$ over X (an equivalence class of a fully visible Bayesian network) encoding only marginal independencies (empty condition sets), and then $\mathcal{G}$ is constructed such that it may mimic $\mathcal{G}_X$ over X, denoted $\mathcal{G}_X \preceq \mathcal{G}$; that is, preserving all conditional dependencies of X in $\mathcal{G}_X$.

The learning process is illustrated in FIGS. 3 and 4 and discussed below. FIG. 3 is a first technique for a simple illustrative case of marginal connectivity learning that performs the learning only for a single latent (hidden) layer of the neural network. FIG. 4 is a second recursive algorithm for an illustrated case of the learning process that uses recursion for the learning the structure across multiple layers.

In detail, FIG. 3 is an example implementation of a process 300 in pseudo-code for learning the LDPGM structure from data, as discussed above with respect to FIG. 1, but illustrating the learning of a single-layer model for the sake of clarity (with only marginal independence tests conducted).

The process 300 summarizes the procedure of constructing g having a single latent layer. The presence of confounders and their inter-relations are not identified, but rather the process augments a fully observed Bayesian network with latent variables, while preserving conditional dependence.

With regard to constructing a stochastic inverse, $\mathcal{G}$ represents a generative distribution of X and is constructed in an unsupervised manner (class variable Y is ignored). Hence, $\mathcal{G}_{Inv}$ is constructed, which is a graphical model that preserves all conditional dependencies in $\mathcal{G}$ but has a different node ordering in which the observed variables, X, have the highest topological order (parentless)—a stochastic inverse of $\mathcal{G}$.

Prior heuristic algorithms considered constructing such stochastic inverses where the structure is a DAG. However, these DAGs, though preserving all conditional dependencies, may omit many independencies and add new edges between layers. The present process avoids limiting $\mathcal{G}_{Inv}$ to a DAG and instead limits it to be a projection of another latent structure. That is, it assumes the presence of additional hidden variables Q that are not in $\mathcal{G}_{Inv}$ but induce dependency among H. For clarity, these variables are omitted from the graph and use bi-directional edges to represent the dependency induced by them. $\mathcal{G}_{Inv}$ is constructed in two steps: 1) invert all $\mathcal{G}$ edges (invert inter-layer connectivity); and 2) connect each pair of latent variables, sharing a common child in $\mathcal{G}$, with a bi-directional edge. This simple procedure ensures $\mathcal{G} \preceq \mathcal{G}_{Inv}$ over X∪H while maintaining the exact same number of edges between the layers.

Conditional dependence relations encoded by the generative structure $\mathcal{G}$, are preserved by the discriminative structure $\mathcal{G}_D$ conditioned on the class Y. That is, $\mathcal{G}_D$ conditioned on Y may mimic $\mathcal{G}$; denoted by preference relation $\mathcal{G} \preceq \mathcal{G}_D | Y$. While the parameters of a model may learn to mimic conditional independence relations that are not expressed by the graph structure, they are not able to learn conditional dependence relations.

Graph $\mathcal{G}_{Inv}$ preserves all conditional dependencies in $\mathcal{G}$ (i.e., $\mathcal{G} \preceq \mathcal{G}_{Inv}$). This may be shown by the following. Graph $\mathcal{G}_{Inv}$ may be constructed using a procedure where nodes are added, one-by-one, to $\mathcal{G}_{Inv}$ in a reverse topological order (lowest first) and connected (as a child) to existing nodes in $\mathcal{G}_{Inv}$ that d-separate it, according to $\mathcal{G}$, from the remainder of $\mathcal{G}_{Inv}$. This method ensures the preservation of conditional dependence $\mathcal{G} \preceq \mathcal{G}_{Inv}$. An equal topological order is set to every pair of latents $(H_i, H_j)$ sharing a common child in $\mathcal{G}$. Hence, jointly adding nodes $H_i$ and $H_j$ to $\mathcal{G}_{Inv}$, connected by a bi-directional edge, requires connecting them (as children) only to their children and the parents of their children ($H_i$ and $H_j$ themselves, by definition) in $\mathcal{G}$. That is, without loss of generality, node $H_i$ is d-separated from the remainder of $\mathcal{G}_{Inv}$ given its children in $\mathcal{G}$ and $H_j$. The stochastic inverse $\mathcal{G}_{Inv}$, constructed without adding inter-layer connections, preserves all conditional dependencies in $\mathcal{G}$.

Furthermore, graph $\mathcal{G}_D$, conditioned on Y, preserves all conditional dependencies in $\mathcal{G}_{Inv}$ (i.e., $\mathcal{G}_{Inv} \preceq \mathcal{G}_D | Y$). This is shown by the fact that it is only required to prove that the dependency relations that are represented by bi-directional edges in $\mathcal{G}_{Inv}$ are preserved in $\mathcal{G}_D$. The proof follows directly from the d-separation criterion. A latent pair {H, H'}□$H^{(n+1)}$, connected by a bi-directional edge in $\mathcal{G}_{Inv}$, cannot be d-separated by any set containing Y, as Y is a descendant of a common child of H and H'. In process 400 (FIG. 4, described in more detail below) at operation 460, a latent in $H^{(n)}$ is connected, as a child, to latents $H^{(n+1)}$, and Y to $H^{(0)}$.

$\mathcal{G}_{Inv}$ may be formulated as a projection of another latent model where bi-directional edges represent dependency relations induced by latent variables Q. A discriminative model may be constructed by considering the effect of Q as an explaining-away relation induced by a class node Y. Thus, conditioned on Y, the discriminative graph $\mathcal{G}_D$ preserves all conditional (and marginal) dependencies in $\mathcal{G}_{Inv}$. The above therefore shows that $\mathcal{G} \preceq \mathcal{G}_{Inv} \preceq \mathcal{G}_D$ conditioned on Y.

Focusing on FIG. 3, the process 300 generates (initializes at operation 315) and maintains internally a directed acyclic graph (DAG $\mathcal{G}_X$) (a DAG is a directed graph in which all edges are directed from one vertex to another that contains no directed cycles) over the input variables (X) 305 and ultimately updates accordingly the deep probabilistic model ($\mathcal{G}$) 310 that is returned at operation 365.

The simplest connected DAG that encodes statistical independence is the v-structure, a structure with three nodes $X_1 \rightarrow X_3 \leftarrow X_2$ in which $X_1$ and $X_2$ are marginally independent $X_1 \perp\!\!\!\perp X_2$ and conditionally dependent $X_1 \not\!\perp\!\!\!\perp X_2 | X_3$. In graphs encoding only marginal independencies, dependent nodes form a clique.

The process 300 loops 325 to process each pair of connected nodes (images) $X_i$, $X_j$ in $\mathcal{G}_X$. A conditional independence test Indep($X_i$, $X_j$) 327 is conducted in operation 325 to determine it the node pairs ($X_i$, $X_j$) are independent or not (i.e., determine dependencies between pairs of channels). The independence is a statistical test and relates to a statistical dependency of node activations, based on predefined (empirically determined) threshold parameters that may be defined in a hyper-parameter (discussed below). Any known form of a statistical test may be used for this, but in one implementation, a partial correlation test may be used. Another statistical test that may be used is a mutual information test. Other known types of statistical tests may be utilized here as well. Tests that determine "marginal" independencies are distinguished from conditionally independent tests because the dependency is tested between pairs and is not conditioned on other variables. Conditional independence tests are tests in which the pair elements are tested by controlling some other variable(s), i.e., the independence is conditioned upon some other variable(s).

Each test measures the correlation between the responses of two convolution kernels/nodes given the response of other kernels/nodes to the input. This test depends on the kernel window size and the stride length. Thus, the HW-related hyper-parameters are naturally incorporated into the statistical test and have an effect on the resulting structure. Put differently, the independence is defined by the statistical test, for example, if they have the same activations to the input images or the pixels resulting from the convolution, if they are correlated, for example by feeding the network with some data and measuring the statistical dependency between the activations of the filters.

The algorithm may learn the structure in an unsupervised manner (i.e., without data labeling/tagging). This may be beneficial for many practical and commercial applications where labeled data is scarce. The sparsity (total number of parameters/degree of connectivity) and depth of the model may be selected using, e.g., the hyper-parameter, where the sparsity relates to connectivity. Having sparse connections means very few links (each link being a set of free parameters, which means having a small number of parameters). Thus, a graceful degradation in accuracy may be obtained for smaller networks. The hyper parameter may be used to control the threshold of the independence test. In FIG. 3, operation 327, inside of the independence test, the threshold is used to determine whether a correlation between $X_i$ and $X_j$ exists to establish independence. How this threshold of the independence test is set controls the depth and the sparsity of the graph.

To illustrate, taking one extreme case, if the threshold is set too high, all of the variables are identified as being independent, and the algorithm will exit on the first recursive call, because all of the nodes will be disconnected from each other and there are not enough neighbors to integrate in the exit condition. This condition results in a single layer network. In the other extreme case, where the threshold is very low, everything is identified as dependent. In this case, the algorithm is unable to disconnect nodes, so the n degree will remain very high, and the algorithm will continue to recursively add more and more latent (hidden) layers, resulting in a network that is very dense and very deep (and have many parameters). In this extreme case, every node is interconnected with every other node. The threshold may be set based on empirical observations and an optimum threshold may differ depending on the application of the CNN.

An example of a conditional independence test (CIT) is provided as follows. Two input feature maps (IFMs), X and Y, may each be viewed as an image in this example, and thus the image may be construed as a single node in the graph that is learned. A database has s instances of the IFM. In an instance, the IFMs correspond to the same "event", e.g., an input image from which they were generated. A window of size m×m selects $m^2$ activations ("pixels") from an IFM. When testing the conditional independence (CI) between X and Y given a set of additional IFMs Z, a window at a given location in the image selects pixels from each of the X, Y, and Z IFMs (around the same location). In this example, let $W_X(i)$, $W_Y(i)$, and $W_Z(i)$ be the activations selected by a window from X, Y, and Z at location i.

A CI test may be defined between X and Y given Z by aggregating multiple CI tests performed on the smaller windows $W_X$, $W_Y$, and $W_Z$ in different locations of the IFMs. Thus, a CI test is first defined for windows of size m×m and then a test for IFMs is defined. The test for the IFM may also provide a relation between the window size m and the condition set size |Z|.

In a CI test for small windows, for each IFM, given a dataset of s instances over $m^2$ activations (s instances of the m×m window at a given location), a new dataset is created of size $s \cdot m^2 \times 1$ (a vector). This is obtained by concatenating the instances of each of the 1 ... $m^2$ activations. For $W_X(i)$, $W_Y(i)$, and $W_Z(i)$, this results in three datasets, denoted by $\mathcal{D}_X(i)$, $\mathcal{D}_Y(i)$, and $\mathcal{D}_Z(i)$ respectively.

In more detail, the dataset of all s instances of a m×m window $$\begin{matrix} X_1^1 & \ldots & X_{m^2}^1 \\ \vdots & \ldots & \vdots \\ X_1^s & \ldots & X_{m^2}^s \end{matrix}$$

is converted into:

$$\mathcal{D}_X(i) = \begin{bmatrix} X_1^1 \\ \vdots \\ X_1^s \\ X_2^1 \\ \vdots \\ X_2^s \\ \vdots \\ X_{m^2}^s \end{bmatrix}.$$

A common CI test is used, such as partial-correlation or conditional mutual information test that take as input two variables and a condition set of variables:

$$CI(W_X(i), W_Y(i) \mid W_Z(i)) =$$
$$CI(\mathcal{D}_X(i), \mathcal{D}_Y(i) \mid \mathcal{D}_Z(i)) = meas(\mathcal{D}_X(i), \mathcal{D}_Y(i) \mid \mathcal{D}_Z(i)) > \gamma$$

The function meas evaluates the level of correlation (e.g., partial correlation) and $\gamma$ is a threshold. Thus, the CI test is binary.

This procedure assumes independence between activations within each IFM and measures inter IFM independence. Another option may be to (randomly) shuffle activation-wise before concatenating the instances. The activations of the different IFMs ($W_X(i)$, $W_Y(i)$, and $W_Z(i)$) are shuffled independently. This results in testing inter-IFM independence between non-corresponding activations (not in the same location in the window). That is, it shuffles the {1 . . . m} indexes (randomly reorders the indexes) before concatenating them.

With regard to A CI Test for the IFMs, each IFM is represented by all the k possible m×m windows. A possible measure is to count the number windows in which CI was identified (binary value 0/1) and divide it by the total number of windows. An approximation may be to sample a subset of k' window locations instead of testing all possible window locations.

$$CI(X, Y \mid Z) = \frac{1}{k} \sum_{i=1}^{k} CI(W_X(i), W_Y(i) \mid W_Z(i))$$
$$= \frac{1}{k} \sum_{i=1}^{k} [meas(\mathcal{D}_X(i), \mathcal{D}_Y(i) \mid \mathcal{D}_Z(i)) > \gamma]$$
$$\approx \frac{1}{k'} \sum_{i \sim U(1,k)} [meas(\mathcal{D}_X(i), \mathcal{D}_Y(i) \mid \mathcal{D}_Z(i)) > \gamma]$$

The window size m depends on the depth of the layer. The deepest layer may be able to look at the entire image—the window size should be as the IFM size. Since in the present case, since the depth of the layer correlates with the condition set size (an empty condition set means the deepest layer) m may be defined as a function of the condition set size.

In a CNN, two common hyper-parameter are the "convolution-window" size and the stride in which the "convolution-window" is applied. For example, a stride of 1 means that the "convolutional-window" moves by one pixel at a time when scanning the image. This affects the "field-of-view" of deeper layers. A simple one-dimensional example with a stride of one and a basic window size of three is illustrated in FIG. 5A, which is a block diagram illustrating an example of a deep generative model and relationships between nodes in layers. The inputs 510, which may represent, e.g., the images 210, provide the hidden variables ($H_x$) at the different layers 520, 530. For the first hidden layer (n) 520, each node "sees" three nodes from the input layer 510. For the second hidden layer (n−1) 530, each node "sees" five nodes from the input. This means that the window size m of the CI test is not the window size of the convolution layer. Instead, it increases for deeper layers according to the stride and convolution window size that may be primarily selected beforehand. For example, for 3×3 convolution layers with stride one, the CI-test window size m increases by two for each deeper layer.

For connected node pairs $X_i$, $X_j$ that are independent of one another, these are disconnected in operation 330. The edges are directed to a common neighbor $X_c$ in operation 335 if the common neighbor exists and if such a common neighbor is not in the conditions set that was severed.

In operation 340, autonomous sets $X_D$ are identified based on nodes having the lowest topological order, i.e., those without outgoing arrows (i.e., having no children). In operation 345, disjoint sets $\{X_{Ai}\}_{i=1}^K$ are identified and grouped after removing the descendant set $X_D$ from the graph $\mathcal{G}_X$ (K represents the number of disjoint sets (ancestor sets)).

The procedure in operations 320-335 decomposes X into autonomous sets (complying with the Markov property) where one set, denoted $X_D$ (descendant set) 340, is the common child of all other sets, denoted $X_{A1}, \ldots, X_{AK}$ (ancestor sets) 345. $X_D$ is selected to be the set of nodes that have the lowest topological order in $\mathcal{G}_X$. Then, by removing $X_D$ from $\mathcal{G}_X$ (temporarily for this step), the resulting K disjoint sets of nodes (corresponding to K disjoint substructures) form the K ancestor sets $\{X_{Ai}\}_{i=1}^K$ 345.

Next, in operation 350, $\mathcal{G}$ is initialized to an empty graph over X. Then, for each ancestor set $X_{Ai}$, a latent variable $H_i$ is introduced and assigned to be a common parent of the pair ($X_{Ai}$, $X_D$) 355, 360. Thus, $$p(X; G) = \int \prod_{i=1}^{K} \left[ p(H_i) \prod_{X \in X_{A_i}} p(X \mid H_i) \right] \prod_{X' \in X_D} p(X' \mid H) dH$$

The parents of two ancestor sets are distinct, whereas the parents set of the descendant set is composed of all the latent variables.

In the auxiliary graph $\mathcal{G}_X$, for each of the resulting v-structures ($X_{Ai} \rightarrow X_D \leftarrow X_{Aj}$), a link between a parent and a child may be replaced by a common latent parent without introducing new independencies. As an example, $X_{A1} = \{A\}$, $X_{A2} = \{B\}$, and $X_D = \{C, D, E\}$. Adding a common latent parent $H_A$ (or $H_B$) and removing all the edges from $X_{A1}$ (or $X_{A2}$) to $X_D$ preserves the conditional dependence $A \not\!\perp B \mid \{C, D, E\}$.

In operation 350, the empty graph $\mathcal{G}$ is created over the input variables X to be used for an output graph. The latent (hidden) layer, which is a convolutional layer, may be created in operation 355 by adding K latent (hidden) variables to the graph $\mathcal{G}$, according to $H=\{H_i\}_{i=1}^{K}$. In operation 360, the connections are made, creating the single latent layer by setting each $H_i$ (representing filters of the layer as a latent node) to be a parent of $\{X_{A1} \cup X_D\}$ (descendent node). The single-layer learning is completed in operation 365 by returning the completed graph $\mathcal{G}$.

With regard to constructing a discriminative graph $\mathcal{G}_D$, recall from the discussion above that $\mathcal{G}$ encodes the generative distribution of X and $\mathcal{G}_{Inv}$ is the stochastic inverse. A discriminative graph $\mathcal{G}_D$ is further constructed by replacing bi-directional dependency relations in $\mathcal{G}_{Inv}$, induced by Q, with explaining-away relations by adding the observed class variable Y (illustrated in FIG. 5C). Node Y is set in $\mathcal{G}_D$ to be the common child of the leaves in $\mathcal{G}_{Inv}$ (latents introduced after testing marginal independencies). This preserves the conditional dependency relations of $\mathcal{G}_{Inv}$. That is, $\mathcal{G}_D$ may mimic $\mathcal{G}_{Inv}$ over X and H given Y (see discussion above). The generative and discriminative graphs share the exact same inter-layer connectivity (inverted edge-directions). Moreover, introducing node Y provides an "explaining away" relation between latents, uniquely for the classification task at hand.

Construction of a feed-forward neural network is based on the connectivity in $\mathcal{G}_D$. Sigmoid belief networks have been shown to be powerful neural network density estimators. In such networks, conditional probabilities are defined as logistic regressors. Similarly, for $\mathcal{G}_D$, for each latent variable H'∈H, the following may be defined:

$$p(H'=1|X)=\text{sigm } W'X'+b'$$

where $\text{sigm}(x)=1/(1+\exp(-x))$, $X'=Pa(H'; \mathcal{G}_D)$, and (W', b') are the parameters of the neural network. Each binary stochastic node H' may be replaced by an infinite number of copies having the same weights but with decreasing bias offsets by one. This infinite set may be approximated by:

$$\sum_{i=1}^{N} \text{sigm}(v - i + 0.5) \approx \log(1 + e^v)$$

where v=W'X'+b'. This function may be further approximated by max(0, v+∈) where ∈ is a zero-centered Gaussian noise. Following these approximations, an approximate probabilistic interpretation may be provided for the ReLU function, max(0, v). These units are able to learn better features for object classification in images.

In order to further increase the representational power, each H' may be represented b a set of neurons having ReLU activation functions. That is, each latent variable H' in $\mathcal{G}_D$ is represented in the neural network by a dense (fully-connected) layer. Finally, the class node Y is represented by a softmax layer.

FIG. 4 is an example implementation of process 400 in pseudo-code for learning the LDPGM structure from data, but extending the description to learning multiple layers by implementing certain operations of the process 300 shown in FIG. 3 recursively.

This extending of the process 300 of learning the connectivity of a single latent (hidden) layer into a process 400 of learning multi-layered structures is done by recursively introducing a new and deeper latent layer by testing $n^{th}$ order conditional independence (n is the condition set size) and connecting it to latent layers created by previous recursive calls that tested conditional independence of order n+1. In this process 400, conditional independence is tested only between input variables X, and condition sets do not include latent variables. Conditioning on latent variables or testing independence between them is not required, since the process 400 adds these latent variables in a specific manner, preserving conditional dependencies between the input variables.

The process 400 may maintain and recursively update an auxiliary graph $\mathcal{G}'_X$ (a CPDAG) over X and utilize it to construct a processed graph $\mathcal{G}$. An efficient algorithm is known (RAI) for constructing a CPDAG over X by a recursive application of conditional independence tests with increasing condition set sizes (n). The process 400 is based on this framework for updating the auxiliary graph $\mathcal{G}'_X$ at operations 425 and 440.

The process 400 starts at 405 with n=0, $\mathcal{G}'_X$ a complete (input) graph, and a set of exogenous nodes $X_{ex}=\emptyset$. The set $X_{ex}$ is exogenous to $\mathcal{G}'_X$ and consists of parents of X. The output of a recursion is a processed graph $\mathcal{G}$, a latent structure over X and H. The exogenous nodes are described as such because of the recursive nature of the algorithm. This means that some of the input nodes (X) will become exogenous to other modes X. The algorithm takes the input and decomposes it into autonomous subsets.

At operation 415, a condition for exiting this recursion, that is, once the recursive procedure reaches a leaf in the execution tree, the executing recursive branch exits by setting the graph $\mathcal{G}$ to the first (input) layer, observed layer X (operation 420). This may be explained in the following manner. The conditional independence test is run between A and B, with C being controlled (however, C may be n other variables). In order to test the independence, the question is whether C is connected to A or B in the graph $\mathcal{G}'_X$ (if C is not connected, this means it is not controlling any of the variables A or B, i.e., it is independent of them). If C is connected to either A or B, it should be included in the conditions set. If testing degree n+1, then the condition set should be n+1 and include at least n variables, and A+B should have n parents or neighbors. That condition set is to be filled with and other variables, but if there are not enough variables to include in the condition set, there are no tests to conduct, and this iteration of the routine exits. The connectivity of graph $\mathcal{G}$ is the dependencies between other variables. If the n degree is low, then this means the graph is very sparse (low total number of parameters), and there are not enough variables to enter into the condition set.

Operation 420 thus acts as an input layer—$\mathcal{G}'_X$ is a graph that is set it to an input layer X, and when this condition is met in this graph of the current iteration, there is only one layer, and that layer is X (which may be viewed as a gather layer). In this case, X is a subset of the input, not the entire input. When returning the observed input layer X, in operation 422, this gathers/selects only the subset of the input.

This routine is considered to be a gather routine because although it returns, it does not exit the algorithm due to its recursive nature. The operations 447 and 449 are recursive calls, and there are two exit locations, at operation 422 (the small problem of this iteration is solved and there is nothing left to do) and operation 465 (everything has been completed and another layer has been added). The recursive nature of the algorithm breaks down the larger problem of overall structure learning into very small problems recursively, until the problem is too small to solve (i.e., there is nothing to do). In the simplest case, if the routine returns in operations 447 or 449, another hidden/latent layer is added/created at line 455 on top of that latent layer after merging, in operation 450, the descendant DAG $\preceq_D$ and the ancestor DAGs $\preceq_{A1} \ldots \preceq_{AK}$ into a processed DAG $\preceq$. The routine then creates, in operation 455, a latent variable layer comprising latent variables $H^{(n)}$. The returned processed DAG $\preceq$ at operation 422 completes the recursion and results in the deep CNN with sparse connectivity (shown in FIG. 5B and discussed below).

The function IncreaseResolution (at operation 425) incorporates the operations 325-335 of the process 300 in terms of splitting up the graph and creating a temporary/auxiliary graph $\preceq'_X$ for subsequent operations. It disconnects conditionally independent variables in two steps. First, it tests dependency between $X_{ex}$ (exogenous nodes) and X, i.e., $X \perp\!\!\!\perp X' | S$ for every connected pair $X \in X$ and $X' \in X_{ex}$ given a condition set $S \square \{X_{ex} \cup X\}$ of size n. Next, it tests dependency within X, i.e., $X_i \perp\!\!\!\perp X_j | S$ for every connected pair $X_i$, $X_j \in X$ given a condition set $S \square \{X_{ex} \cup X\}$ of size n. After removing the corresponding edges, the remaining edges are directed by applying two rules. First, v-structures are identified and directed. Then, edges are continually directed, by avoiding the creation of new v-structures and directed cycles, until no more edges may be directed. Thus, this function increases the graph d-separation resolution from n−1 to n.

While operation 425 test for independence and then directs node edges according to some rules, the operation SplitAutonomous 440 identifies autonomous sets in a graph. The operation SplitAutonomous 440 selects the lowest topological nodes—it selects the leaves ($X_D$) in the graph, and $X_{A1}$ to $X_{AK}$ are disconnected/disjoint sets that remain if $X_D$ were to be temporarily removed. Thus, operation SplitAutonomous 440 uses the results of operation 425 to identify autonomous subsets that may be split. The operation SplitAutonomous 440 removes the edges that connect the descendants from all of the ancestors since the ancestor groups are all connected to the descendant group (and not among themselves)—thus, disconnecting them from the descendant group makes them set of autonomous groups.

In more detail, an autonomous set in $\preceq'_X$ includes all its nodes' parents (complying with the Markov property) and therefore a corresponding latent structure may be constructed independently using a recursive call. Thus, the algorithm is recursively and independently called for the ancestor sets in operation 445, and then called for the descendant set while treating the ancestor sets as exogenous in operation 447. The operation SplitAutonomous 440 (corresponding to operations 340, 345 of FIG. 3) splits X into the subsets of $X_D$ and $X_{A1}$ to $X_{AK}$ (for a total of K+1 subsets—the union of all of these sets being X). The exogenous sets $X_{ex}$ are from the "outside". In operation 449, the operation is called recursively similar to operation 447, but the exogenous set for the call is the current exogenous set passed into the routine combined (union) with all of the autonomous sets $X_{Ai}$.

Each recursive call returns a latent structure for each autonomous set. Recall that each latent structure encodes a generative distribution over the observed variables where layer H(n+1), the last added layer (parentless nodes), is a representation of the input $X' \square X$. By considering only layer H(n+1) of each latent structure, we have the same simple scenario discussed above with respect to process 300—the connectivity between H(n), a new latent layer, and H(n+1), treated as an "input" layer. Thus, latent variables are introduced as parents of the H(n+1) layers, as described in operations 455, 460 (which correspond to operations 355, 360 of FIG. 3).

The stochastic inverse $\preceq_{Inv}$ may be constructed as described above with respect to process 300—the edge directions are inverted and bi-directional edges are added between every pair of latents sharing a common child in $\preceq$. A discriminative structure $\preceq_D$ may then be constructed by removing all the bi-directional edges and adding the class node Y as a common child of layer $H^{(0)}$, the last latent layer that is added. Finally, a neural network is constructed based on the connectivity of $\preceq_D$. That is, each latent node, $H \in H^{(n)}$, is replaced by a set of neurons, and each edge between two latents, $H \in H^{(n)}$ and $H' \in H^{(n+1)}$, is replaced by a bipartite graph connecting the neurons corresponding to H and H'.

As discussed above (and summarized briefly here), FIG. 5A is a block diagram illustrating an example of a deep generative model. The inputs 510 provide the hidden variables ($H_x$) at the different layers 520, 530, and the different layer nodes have an ability to "see" different numbers of nodes based on their placement in the structure, and the window size m of the CI test increases for deeper layers according to the stride and convolution window size that may be primarily selected beforehand.

FIG. 5B is a block diagram illustrating an example of a deep generative model $\preceq$ 500 constructed similar to that of FIG. 1, that may be generated by the process 400 of FIG. 4. The inputs 510, which may represent, e.g., the images 210, provide the hidden variables ($H_x$) at the different convolutional layers 520, 530.

FIG. 5C is a block diagram illustrating a discriminating model 550 created based on the deep generative model 500. To create the discriminating model 550, the deep generative model $\preceq$ 500 is converted into an inverse model $\mathcal{G}_{INV}$ by inverting all edges (shown by reversed arrow direction in the FIGS.) and adding bi-directional edges between the latent (hidden) variables $H_x$ of the same order. Finally, a class variable (node) Y 540 is added as the observed child of the deepest layer and all of the bi-directional edges are removed to obtain a discriminative probabilistic model $\mathcal{G}_D$. The class variable Y 540 is based on information in the database comprising supervised training data for the CNN. For image classification, this database would usually contain the features, the inputs (images), for example. In FIGS. 5A and 5B, the inputs A-E 510 would be the input images, and the class variable Y 540 would be a label of that image, e.g., whether it is a cat or a dog.

This structure learning process learns the structure in an unsupervised manner, and thus it does not need to know the label of the image. It learns the structure by measuring statistical independencies between the filters, the responses of those filters, the way the filters respond to the image in test, and the statistical independencies between the responses—based on these, it may construct the structure of the neural network. And once the structure of the neural network is known, the class node Y may be added.

The end result is a design in which the connectivity between layers is significantly sparser than the connectivity between layers of a traditional CNN. This sparser connectivity may be leveraged for hardware implementation or acceleration. For example, the hardware portion that performs the convolution may be significantly smaller with this design, and may utilize significantly smaller multipliers to calculate the output of the CNN.

The present design is thus hardware friendly with regard to block convolution and hardware related parameters. For block convolution, while the convolution operation itself is unaffected, the number of channels (block depth) that need to be convolved for each next-layer channel may be learned, which makes the implementation for learning the structure described herein a hardware friendly solution. For the hardware-related parameters, hyper-parameters, such as convolution window size (e.g., $3\times3\times n_z$), may be limited by hardware constraints. An implementation of the method disclosed herein may learn an "optimal" structure (automatically determined depth and connectivity) while fixing these hyper-parameters (restricting to a specific value/range). For example, selecting a specific window size may result in a corresponding optimal structure. According to an implementation of a method disclosed herein, the method finds an optimal structure of a probabilistic model and, based on this structure, constructs the CNN structure. Thus, the learned CNN structure is optimal in an unsupervised setting under probabilistic assumptions. Supervised learning may be obtained by learning the parameters without the need to change the structure.

Processing Device Description

Figure 6:
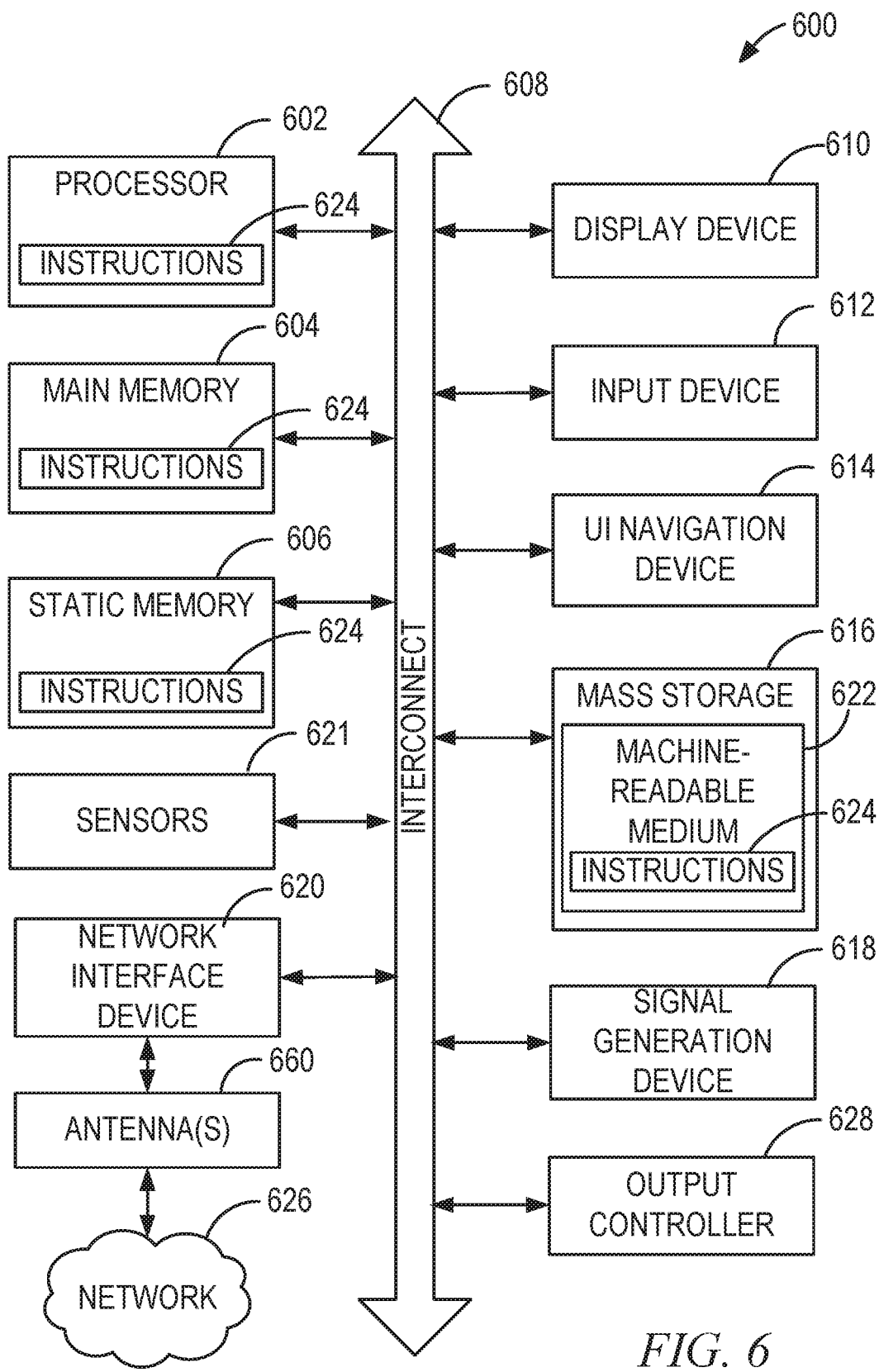
FIG. 6 is a block diagram illustrating a machine in the example form of a computer system on which the CNN may be run.

FIG. 6 is a block diagram illustrating a machine in the example form of a computer system 600, such as one that might make up neural net processor described above. The computer system 600 may include a set or sequence of executable instructions to cause the machine to perform any one of the methodologies discussed herein, according to an example implementation. In alternative implementations, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one implementation, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, one or more sensors 621, such as a global positioning system (GPS) sensor, compass, accelerometer, or other sensor, an output controller 628, and antenna(s) 660.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example implementation to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G Long Term Evolution (LTE)/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Implementations may be implemented in one or a combination of hardware, firmware, and software. Implementations may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, logic or circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above detailed description includes references to the accompanying drawings, which form a part of the detailed description. The drawings show, by way of illustration, specific implementations that may be practiced. These implementations are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other implementations may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as implementations may feature a subset of said features. Further, implementations may include fewer features than those disclosed in a particular example. Thus, the following claims are hereby incorporated into the Detailed Description, with a claim standing on its own as a separate implementation. The scope of the implementations disclosed herein is to be determined with reference to the appended claims, along with the full scope of equivalents to which such claims are entitled.

The following are Examples related to that above.

Example 1 is an apparatus for producing a deep convolution neural network (CNN), the apparatus comprising: memory and processing circuitry coupled to the memory, the processing circuitry to: iteratively process an input directed acyclic graph (DAG), a set of nodes, a set of exogenous nodes, and a resolution based on the CNN, an iteration for a node in the set of nodes of the CNN including the processing circuitry to further: increase a resolution of the DAG by creating a temporary DAG used for a current recursive iteration based on the DAG and the resolution; recursively perform the iteration upon each node in a descendant node set to create a descendant DAG, the descendent node set being autonomous nodes having a lowest topological order; recursively perform the iteration upon each node in ancestor node sets to create ancestor DAGs, the ancestor node sets being the remainder of nodes in the temporary DAG after nodes of the descendent node set are removed, wherein the descendant node set is a common child of the ancestor node sets; merge the descendant DAG and the ancestor DAGs into a processed DAG; create a latent layer in the processed DAG that includes, a latent node for each ancestor node set for the current resolution; set each latent node to be a parent of sets of parentless nodes in a combined descendant DAG and ancestors DAGs; and return the processed DAG.

In Example 2, the subject matter of Example 1 includes, wherein the increasing of the resolution of the DAG comprises having the processing circuitry to further: for each pair of connected nodes in the temporary DAG: disconnect a pair of the connected nodes when the connected nodes are independent of one another; and direct node edges of the disconnected nodes to a common neighbor node when the common neighbor node is not independent of the disconnected nodes.

In Example 3, the subject matter of Example 2 includes, wherein the determination of when the pair of the connected nodes are independent is done by a statistical test and relates to a statistical dependency of node activations.

In Example 4, the subject matter of Example 3 includes, wherein the statistical test is a conditional independence test (CIT).

In Example 5, the subject matter of Example 4 includes, wherein the CIT is a partial correlation test or a conditional mutual information test.

In Example 6, the subject matter of Example 5 includes, wherein the CIT is a binary test yielding a binary value of zero or one of a form:

$$CI(W_X(i), W_Y(i) | W_Z(i)) = CI(\mathcal{D}_X(i), \mathcal{D}_Y(i) | \mathcal{D}_Z(i))$$
$$= meas(\mathcal{D}_X(i), \mathcal{D}_Y(i) | \mathcal{D}_Z(i)) > \gamma$$

where:
$\mathcal{D}_X(i)$ and $\mathcal{D}_Y(i)$) are input variables;
$\mathcal{D}_Z(i)$ is a condition set of variables;
meas( ) evaluates a level of correlation; and
$\gamma$ is a threshold value.

In Example 7, the subject matter of Example 6 includes, wherein: the input variables are input feature maps (IFMs); each IFM is represented by all k possible m×m windows; and meas( ) is determined by a count of a number of windows in which the CIT binary value is one and dividing by a total number of windows.

In Example 8, the subject matter of Examples 6-7 includes, wherein: the input variables are input feature maps (IFMs); each IFM is represented by all k possible m×m windows; and
meas( ) is determined by sampling a subset of k' window locations according to:

$$CI(X, Y | Z) = \frac{1}{k} \sum_{i=1}^{k} CI(W_X(i), W_Y(i) | W_Z(i))$$
$$= \frac{1}{k} \sum_{i=1}^{k} [meas(\mathcal{D}_X(i), \mathcal{D}_Y(i) | \mathcal{D}_Z(i)) > \gamma]$$
$$\approx \frac{1}{k'} \sum_{i \sim U(1,k)} [meas(\mathcal{D}_X(i), \mathcal{D}_Y(i) | \mathcal{D}_Z(i)) > \gamma]$$

In Example 9, the subject matter of Examples 4-8 includes, wherein the CIT is dependent upon: a kernel convolution window size; a convolution window stride length; and a predefined threshold defined in a hyper-parameter.

In Example 10, the subject matter of Examples 1-9 includes, the processing circuitry to convert the processed DAG into the deep CNN by inverting edge directions to produce a discriminative DAG.

In Example 11, the subject matter of Example 10 includes, wherein the converting of the processed DAG into the deep CNN further comprises the processing circuitry to add a class node represented by a softmax layer.

In Example 12, the subject matter of Examples 1-11 includes, the processing circuitry to convolve initial inputs with predefined filters.

In Example 13, the subject matter of Examples 1-12 includes, wherein an initial set of nodes for at least one recursion comprises input feature maps (IFMs).

In Example 14, the subject matter of Examples 1-13 includes, wherein the initial set of nodes for at least one recursion comprises images.

In Example 15, the subject matter of Examples 1-14 includes, the processing circuitry to determine when an exit condition is true and exit the recursive method when true.

In Example 16, the subject matter of Example 15 includes, wherein the determining of the condition being true comprises the processing circuitry to determine when it has reached an execution tree leaf, and set the graph G to a first layer.

Example 17 is a recursive method for producing a deep convolution neural network (CNN), the method comprising performing, by a processor: iteratively processing an input directed acyclic graph (DAG), a set of nodes, a set of exogenous nodes, and a resolution based on the CNN, an iteration for a node in the set of nodes of the CNN including: increasing a resolution of the DAG by creating a temporary DAG used for a current recursive iteration based on the DAG and the resolution; recursively performing the iteration upon each node in a descendant node set to create a descendant DAG, the descendent node set being autonomous nodes having a lowest topological order; recursively performing the iteration upon each node in ancestor node sets to create ancestor DAGs, the ancestor node sets being a remainder of nodes in the temporary DAG after nodes of the descendent node set are removed, wherein the descendant node set is a common child of the ancestor node sets; merging the descendant DAG and the ancestor DAGs into a processed DAG; creating a latent layer in the processed DAG that includes, a latent node for each ancestor node set for a current resolution; setting each latent node to be a parent of sets of parentless nodes in a combined descendant DAG and ancestors DAGs; and returning the processed DAG.

In Example 18, the subject matter of Example 17 includes, wherein the increasing of the resolution of the DAG comprises: for each pair of connected nodes in the temporary DAG: disconnecting a pair of the connected nodes when the connected nodes are independent of one another; and directing node edges of the disconnected nodes to a common neighbor node when the common neighbor node is not independent of the disconnected nodes.

In Example 19, the subject matter of Example 18 includes, wherein the determination of when the pair of the connected nodes are independent is done by a statistical test and relates to a statistical dependency of node activations.

In Example 20, the subject matter of Example 19 includes, wherein the statistical test is a conditional independence test (CIT).

In Example 21, the subject matter of Example 20 includes, wherein the CIT is a partial correlation test or a conditional mutual information test.

In Example 22, the subject matter of Example 21 includes, wherein the CIT is a binary test yielding a binary value of zero or one of a form:

$$CI(W_X(i), W_Y(i) | W_Z(i)) = CI(\mathcal{D}_X(i), \mathcal{D}_Y(i) | \mathcal{D}_Z(i))$$
$$= meas(\mathcal{D}_X(i), \mathcal{D}_Y(i) | \mathcal{D}_Z(i)) > \gamma$$

where:
$\mathcal{D}_X(i)$ and $\mathcal{D}_Y(i)$) are input variables;
$\mathcal{D}_Z(i)$ is a condition set of variables;
meas( ) evaluates a level of correlation; and
$\gamma$ is a threshold value.

In Example 23, the subject matter of Example 22 includes, wherein: the input variables are input feature maps (IFMs); each IFM is represented by all k possible m×m windows; and meas( ) is determined by counting a number of windows in which the CIT binary value is one and dividing by a total number of windows.

In Example 24, the subject matter of Examples 22-23 includes, wherein: the input variables are input feature maps (IFMs); each IFM is represented by all k possible m×m windows; and meas( ) is determined by sampling a subset of k' window locations according to:

$$CI(X, Y \mid Z) = \frac{1}{k}\sum_{i=1}^{k} CI(W_X(i), W_Y(i) \mid W_Z(i))$$

$$= \frac{1}{k}\sum_{i=1}^{k} [meas(\mathcal{D}_X(i), \mathcal{D}_Y(i) \mid \mathcal{D}_Z(i)) > \gamma]$$

$$\approx \frac{1}{k'}\sum_{i \sim U(1,k)} [meas(\mathcal{D}_X(i), \mathcal{D}_Y(i) \mid \mathcal{D}_Z(i)) > \gamma]$$

In Example 25, the subject matter of Examples 20-24 includes, wherein the CIT is dependent upon: a kernel convolution window size; a convolution window stride length; and a predefined threshold defined in a hyperparameter.

In Example 26, the subject matter of Examples 17-25 includes, converting the processed DAG into the deep CNN by inverting edge directions to produce a discriminative DAG.

In Example 27, the subject matter of Example 26 includes, wherein converting the processed DAG into the deep CNN further comprises adding a class node represented by a softmax layer.

In Example 28, the subject matter of Examples 17-27 includes, convolving initial inputs with predefined filters.

In Example 29, the subject matter of Examples 17-28 includes, wherein an initial set of nodes for at least one recursion comprises input feature maps (IFMs).

In Example 30, the subject matter of Examples 17-29 includes, wherein the initial set of nodes for at least one recursion comprises images.

In Example 31, the subject matter of Examples 17-30 includes, determining when an exit condition is true and exiting the recursive method when true.

In Example 32, the subject matter of Example 31 includes, wherein the determining of the condition being true comprises determining when an execution tree leaf has been reached, and setting the processed graph to a first layer.

Example 33 is a computer program product comprising one or more computer readable storage media comprising computer-executable instructions operable to, when executed by processing circuitry of an apparatus, cause the apparatus to: iteratively process an input directed acyclic graph (DAG), a set of nodes, a set of exogenous nodes, and a resolution based on the CNN, an iteration for a node in the set of nodes of the CNN including the processing circuitry to further: increase a resolution of the DAG by creating a temporary DAG used for a current recursive iteration based on the DAG and the resolution; recursively perform the iteration upon each node in a descendant node set to create a descendant DAG, the descendent node set being autonomous nodes having a lowest topological order; recursively perform the iteration upon each node in ancestor node sets to create ancestor DAGs, the ancestor node sets being the remainder of nodes in the temporary DAG after nodes of the descendent node set are removed, wherein the descendant node set is a common child of the ancestor node sets; merge the descendant DAG and the ancestor DAGs into a processed DAG; create a latent layer in the processed DAG that includes, a latent node for each ancestor node set for the current resolution; set each latent node to be a parent of sets of parentless nodes in a combined descendant DAG and ancestors DAGs; and return the processed DAG.

In Example 34, the subject matter of Example 33 includes, herein the increasing of the resolution of the DAG comprises having the processing circuitry to further: for each pair of connected nodes in the temporary DAG: disconnect a pair of the connected nodes when the connected nodes are independent of one another; and direct node edges of the disconnected nodes to a common neighbor node when the common neighbor node is not independent of the disconnected nodes.

In Example 35, the subject matter of Example 34 includes, wherein the determination of when the pair of the connected nodes are independent is done by a statistical test and relates to a statistical dependency of node activations.

In Example 36, the subject matter of Example 35 includes, wherein the statistical test is a conditional independence test (CIT).

In Example 37, the subject matter of Example 36 includes, wherein the CIT is a partial correlation test or a conditional mutual information test.

In Example 38, the subject matter of Example 37 includes, wherein the CIT is a binary test yielding a binary value of zero or one of a form:

$$CI(W_X(i), W_Y(i) \mid W_Z(i)) = CI(\mathcal{D}_X(i), \mathcal{D}_Y(i) \mid \mathcal{D}_Z(i))$$

$$= meas(\mathcal{D}_X(i), \mathcal{D}_Y(i) \mid \mathcal{D}_Z(i)) > \gamma$$

where:
$\mathcal{D}_X(i)$ and $\mathcal{D}_Y(i)$) are input variables;
$\mathcal{D}_Z(i)$ is a condition set of variables;
meas( ) evaluates a level of correlation; and
$\gamma$ is a threshold value.

In Example 39, the subject matter of Example 38 includes, wherein: the input variables are input feature maps (IFMs); each IFM is represented by all k possible m×m windows; and meas( ) is determined by a count of a number of windows in which the CIT binary value is one and dividing by a total number of windows.

In Example 40, the subject matter of Examples 38-39 includes, wherein: the input variables are input feature maps (IFMs); each IFM is represented by all k possible m×m windows; and meas( ) is determined by sampling a subset of k' window locations according to:

$$CI(X, Y \mid Z) = \frac{1}{k}\sum_{i=1}^{k} CI(W_X(i), W_Y(i) \mid W_Z(i))$$

$$= \frac{1}{k}\sum_{i=1}^{k} [meas(\mathcal{D}_X(i), \mathcal{D}_Y(i) \mid \mathcal{D}_Z(i)) > \gamma]$$

$$\approx \frac{1}{k'}\sum_{i \sim U(1,k)} [meas(\mathcal{D}_X(i), \mathcal{D}_Y(i) \mid \mathcal{D}_Z(i)) > \gamma]$$

In Example 41, the subject matter of Examples 36-40 includes, wherein the CIT is dependent upon: a kernel convolution window size; a convolution window stride length; and a predefined threshold defined in a hyperparameter.

In Example 42, the subject matter of Examples 33-41 includes, the processing circuitry to convert the processed DCRMG into the deep CNN by inverting edge directions to produce a discriminative DCRMG.

In Example 43, the subject matter of Example 42 includes, wherein the converting of the processed DCRMG into the deep CNN further comprises the processing circuitry to add a class node represented by a softmax layer.

In Example 44, the subject matter of Examples 33-43 includes, the processing circuitry to convolve initial inputs with predefined filters.

In Example 45, the subject matter of Examples 33-44 includes, wherein an initial set of nodes for at least one recursion comprises input feature maps (IFMs).

In Example 46, the subject matter of Examples 33-45 includes, wherein the initial set of nodes for at least one recursion comprises images.

In Example 47, the subject matter of Examples 33-46 includes, the processing circuitry to determine when an exit condition is true and exit the recursive method when true.

In Example 48, the subject matter of Example 47 includes, wherein the determining of the condition being true comprises the processing circuitry to determine when it has reached an execution tree leaf, and set the graph G to a first layer.

Example 49 is an apparatus for producing a deep convolution neural network (CNN), comprising: means for iteratively processing an input directed acyclic graph (DAG), a set of nodes, a set of exogenous nodes, and a resolution based on the CNN, an iteration for a node in the set of nodes of the CNN including: means for increasing a resolution of the DAG by creating a temporary DAG used for a current recursive iteration based on the DAG and the resolution; means for recursively performing the iteration upon each node in a descendant node set to create a descendant DAG, the descendent node set being autonomous nodes having a lowest topological order; means for recursively performing the iteration upon each node in ancestor node sets to create ancestor DAGs, the ancestor node sets being a remainder of nodes in the temporary DAG after nodes of the descendent node set are removed, wherein the descendant node set is a common child of the ancestor node sets; means for merging the descendant DAG and the ancestor DAGs into a processed DAG; means for creating a latent layer in the processed DAG that includes, a latent node for each ancestor node set for a current resolution; means for setting each latent node to be a parent of sets of parentless nodes in a combined descendant DAG and ancestors DAGs; and means for returning the processed DAG.

In Example 50, the subject matter of Example 49 includes, wherein the apparatus further comprises, for the increasing of the resolution of the DAG: for each pair of connected nodes in the temporary DAG: means for disconnecting a pair of the connected nodes when the connected nodes are independent of one another; and means for directing node edges of the disconnected nodes to a common neighbor node when the common neighbor node is not independent of the disconnected nodes.

In Example 51, the subject matter of Example 50 includes, wherein the determination of when the pair of the connected nodes are independent is done by a statistical test and relates to a statistical dependency of node activations.

In Example 52, the subject matter of Example 51 includes, wherein the statistical test is a conditional independence test (CIT).

In Example 53, the subject matter of Example 52 includes, wherein the CIT is a partial correlation test or a conditional mutual information test.

In Example 54, the subject matter of Example 53 includes, wherein the CIT is a binary test yielding a binary value of zero or one of form:

$$CI(W_X(i), W_Y(i) | W_Z(i)) = CI(\mathcal{D}_X(i), \mathcal{D}_Y(i) | \mathcal{D}_Z(i))$$
$$= meas(\mathcal{D}_X(i), \mathcal{D}_Y(i) | \mathcal{D}_Z(i)) > \gamma$$

where:
$\mathcal{D}_X(i)$ and $\mathcal{D}_Y(i)$) are input variables;
$\mathcal{D}_Z(i)$ is a condition set of variables;
meas( ) evaluates a level of correlation; and
$\gamma$ is a threshold value.

In Example 55, the subject matter of Example 54 includes, wherein: the input variables are input feature maps (IFMFs); each IFMF is represented by all k possible m×m windows; and meas( ) is determined by counting a number of windows in which the CIT binary value is one and dividing by a total number of windows.

In Example 56, the subject matter of Examples 54-55 includes, wherein: the input variables are input feature maps (IFMFs); each IFMF is represented by all k possible m×m windows; and
meas( ) is determined by sampling a subset of k' window locations according to:

$$CI(X, Y | Z) = \frac{1}{k} \sum_{i=1}^{k} CI(W_X(i), W_Y(i) | W_Z(i))$$
$$= \frac{1}{k} \sum_{i=1}^{k} [meas(\mathcal{D}_X(i), \mathcal{D}_Y(i) | \mathcal{D}_Z(i)) > \gamma]$$
$$\approx \frac{1}{k'} \sum_{i \sim U(1,k)} [meas(\mathcal{D}_X(i), \mathcal{D}_Y(i) | \mathcal{D}_Z(i)) > \gamma]$$

In Example 57, the subject matter of Examples 52-56 includes, wherein the CIT is dependent upon: a kernel convolution window size; a convolution window stride length; and a predefined threshold defined in a hyperparameter.

In Example 58, the subject matter of Examples 49-57 includes, means for converting the processed DAG into the deep CNN by inverting edge directions to produce a discriminative DAG.

In Example 59, the subject matter of Example 58 includes, wherein the means for converting the processed DAG into the deep CNN further comprises means for adding a class node represented by a softmax layer.

In Example 60, the subject matter of Examples 49-59 includes, means for convolving initial inputs with predefined filters.

In Example 61, the subject matter of Examples 49-60 includes, wherein an initial set of nodes for at least one recursion comprises input feature maps (IFMFs).

In Example 62, the subject matter of Examples 49-61 includes, wherein the initial set of nodes for at least one recursion comprises images.

In Example 63, the subject matter of Examples 49-62 includes, means for determining when an exit condition is true and exiting the recursive method when true.

In Example 64, the subject matter of Example 63 includes, wherein the means for determining of the condition being true comprises means for determining when it has reached an execution tree leaf, and means for setting the processed graph to a first layer.

Example 65 is a computer program product comprising one or more computer readable storage media comprising computer-executable instructions operable to, when executed by processing circuitry of a device, cause the device to perform any of the methods of Examples 17-32.

Example 66 is a system comprising means to perform any of the methods of Examples 17-32.

Example 67 is a system to perform any of the operations of Examples 1-64.

Example 68 is a method to perform any of the operations of Examples 1-64.

Example 69 is an apparatus comprising means to implement of any of Examples 1-64.

What is claimed is:

1. An apparatus for producing a deep convolution neural network (CNN), the apparatus comprising: memory and processing circuitry coupled to the memory, the processing circuitry to:
   iteratively process an input directed acyclic graph (DAG), a set of nodes, a set of exogenous nodes, and a resolution based on the CNN, an iteration for a node in the set of nodes of the CNN including the processing circuitry to further:
      increase a resolution of the DAG by creating a temporary DAG used for a current recursive iteration based on the DAG and the resolution;
      recursively perform the iteration upon each node in a descendant node set to create a descendant DAG, the descendent node set being autonomous nodes having a lowest topological order;
      recursively perform the iteration upon each node in ancestor node sets to create ancestor DAGs, the ancestor node sets being the remainder of nodes in the temporary DAG after nodes of the descendent node set are removed, wherein the descendant node set is a common child of the ancestor node sets;
      merge the descendant DAG and the ancestor DAGs into a processed DAG;
      create a latent layer in the processed DAG that includes a latent node for each ancestor node set for the current resolution;
      set each latent node to be a parent of sets of parentless nodes in a combined descendant DAG and ancestors DAGs; and
      return the processed DAG.

2. The apparatus of claim 1, wherein the increasing of the resolution of the DAG comprises having the processing circuitry to further:
   for each pair of connected nodes in the temporary DAG:
      disconnect a pair of the connected nodes when the connected nodes are independent of one another; and
      direct node edges of the disconnected nodes to a common neighbor node when the common neighbor node is not independent of the disconnected nodes.

3. The apparatus of claim 2, wherein the determination of when the pair of the connected nodes are independent is done by a statistical test and relates to a statistical dependency of node activations.

4. The apparatus of claim 3, wherein the statistical test is a conditional independence (CI) test (CIT).

5. The apparatus of claim 4, wherein the CIT is a partial correlation test or a conditional mutual information test.

6. The apparatus of claim 5, wherein the CIT is a binary test yielding a binary value of zero or one of a form:

$$CI(W_X(i), W_Y(i) | W_Z(i)) = CI(\mathcal{D}_X(i), \mathcal{D}_Y(i) | \mathcal{D}_Z(i))$$
$$= meas(\mathcal{D}_X(i), \mathcal{D}_Y(i) | \mathcal{D}_Z(i)) > \gamma$$

where:
   $W_X(i)$, $W_Y(i)$, and $W_Z(i)$ are activations selected by a window from feature maps X, Y, and Z at location i;
   $\mathcal{D}_X(i)$ and $\mathcal{D}_Y(i))$ are input variables;
   $\mathcal{D}_Z(i)$ is a condition set of variables;
   meas( ) evaluates a level of correlation; and
   $\gamma$ is a threshold value.

7. The apparatus of claim 6, wherein:
   the input variables are input feature maps (IFMs);
   each IFM is represented by all k possible m×m windows; and
   meas( ) is determined by a count of a number of windows in which the CIT binary value is one and dividing by a total number of windows.

8. The apparatus of claim 6, wherein:
   the input variables are input feature maps (IFMs);
   each IFM is represented by all k possible m×m windows; and
   meas( ) is determined by sampling a subset of k' window locations according to:

$$CI(X, Y | Z) = \frac{1}{k}\sum_{i=1}^{k} CI(W_X(i), W_Y(i) | W_Z(i))$$
$$= \frac{1}{k}\sum_{i=1}^{k} [meas(\mathcal{D}_X(i), \mathcal{D}_Y(i) | \mathcal{D}_Z(i)) > \gamma]$$
$$\approx \frac{1}{k'}\sum_{i \sim U(1,k)} [meas(\mathcal{D}_X(i), \mathcal{D}_Y(i) | \mathcal{D}_Z(i)) > \gamma]$$

9. The apparatus of claim 4, wherein the CIT is dependent upon:
   a kernel convolution window size;
   a convolution window stride length; and
   a predefined threshold defined in a hyper-parameter.

10. A recursive method for producing a deep convolution neural network (CNN), the method comprising performing, by a processor:
   iteratively processing an input directed acyclic graph (DAG), a set of nodes, a set of exogenous nodes, and a resolution based on the CNN, an iteration for a node in the set of nodes of the CNN including:
      increasing a resolution of the DAG by creating a temporary DAG used for a current recursive iteration based on the DAG and the resolution;
      recursively performing the iteration upon each node in a descendant node set to create a descendant DAG, the descendent node set being autonomous nodes having a lowest topological order;
      recursively performing the iteration upon each node in ancestor node sets to create ancestor DAGs, the ancestor node sets being a remainder of nodes in the temporary DAG after nodes of the descendent node set are removed, wherein the descendant node set is a common child of the ancestor node sets;

merging the descendant DAG and the ancestor DAGs into a processed DAG;

creating a latent layer in the processed DAG that includes a latent node for each ancestor node set for a current resolution;

setting each latent node to be a parent of sets of parentless nodes in a combined descendant DAG and ancestors DAGs; and returning the processed DAG.

11. The method of claim 10, wherein the increasing of the resolution of the DAG comprises:

for each pair of connected nodes in the temporary DAG:
disconnecting a pair of the connected nodes when the connected nodes are independent of one another; and
directing node edges of the disconnected nodes to a common neighbor node when the common neighbor node is not independent of the disconnected nodes.

12. The method of claim 11, wherein the determination of when the pair of the connected nodes are independent is done by a statistical test and relates to a statistical dependency of node activations.

13. The method of claim 12, wherein the statistical test is a conditional independence (CI) test (CIT).

14. The method of claim 13, wherein the CIT is a partial correlation test or a conditional mutual information test.

15. The method of claim 14, wherein the CIT is a binary test yielding a binary value of zero or one of a form:

$$CI(W_X(i), W_Y(i) | W_Z(i)) = CI(\mathcal{D}_X(i), \mathcal{D}_Y(i) | \mathcal{D}_Z(i))$$

$$= meas(\mathcal{D}_X(i), \mathcal{D}_Y(i) | \mathcal{D}_Z(i)) > \gamma$$

where:
$W_X(i)$, $W_Y(i)$, and $W_Z(i)$ are activations selected by a window from feature maps X, Y, and Z at location i;
$\mathcal{D}_X(i)$ and $\mathcal{D}_Y(i)$) are input variables;
$\mathcal{D}_Z(i)$ is a condition set of variables;
meas( ) evaluates a level of correlation; and
$\gamma$ is a threshold value.

16. The method of claim 15, wherein:
the input variables are input feature maps (IFMs);
each IFM is represented by all k possible m×m windows; and
meas( ) is determined by counting a number of windows in which a binary value of the CIT is one and dividing by a total number of windows.

17. The method of claim 15, wherein:
the input variables are input feature maps (IFMs);
each IFM is represented by all k possible m×m windows; and
meas( ) is determined by sampling a subset of k' window locations according to:

$$CI(X, Y | Z) = \frac{1}{k}\sum_{i=1}^{k} CI(W_X(i), W_Y(i) | W_Z(i))$$

$$= \frac{1}{k}\sum_{i=1}^{k} [meas(\mathcal{D}_X(i), \mathcal{D}_Y(i) | \mathcal{D}_Z(i)) > \gamma]$$

-continued $$\approx \frac{1}{k'}\sum_{i \sim U(1,k)} [meas(\mathcal{D}_X(i), \mathcal{D}_Y(i) | \mathcal{D}_Z(i)) > \gamma]$$

18. The method of claim 13, wherein the CIT is dependent upon:
a kernel convolution window size;
a convolution window stride length; and
a predefined threshold defined in a hyper-parameter.

19. The method of claim 10, further comprising converting the processed DAG into the deep CNN by inverting edge directions to produce a discriminative DAG.

20. The method of claim 19, wherein converting the processed DAG into the deep CNN further comprises adding a class node represented by a softmax layer.

21. The method of claim 10, wherein an initial set of nodes for at least one recursion comprises input feature maps (IFMs).

22. The method of claim 10, wherein an initial set of nodes for at least one recursion comprises images.

23. A non-transitory computer program product comprising one or more computer readable storage media comprising computer-executable instructions operable to, when executed by processing circuitry of an apparatus, cause the apparatus to:

iteratively process an input directed acyclic graph (DAG), a set of nodes, a set of exogenous nodes, and a resolution based on the CNN, an iteration for a node in the set of nodes of the CNN including the processing circuitry to further:
increase a resolution of the DAG by creating a temporary DAG used for a current recursive iteration based on the DAG and the resolution;
recursively perform the iteration upon each node in a descendant node set to create a descendant DAG, the descendent node set being autonomous nodes having a lowest topological order;
recursively perform the iteration upon each node in ancestor node sets to create ancestor DAGs, the ancestor node sets being the remainder of nodes in the temporary DAG after nodes of the descendent node set are removed, wherein the descendant node set is a common child of the ancestor node sets;
merge the descendant DAG and the ancestor DAGs into a processed DAG;
create a latent layer in the processed DAG that includes a latent node for each ancestor node set for the current resolution;
set each latent node to be a parent of sets of parentless nodes in a combined descendant DAG and ancestors DAGs; and
return the processed DAG.

24. The non-transitory computer program product of claim 23, wherein the increasing of the resolution of the DAG comprises having the processing circuitry to further:
for each pair of connected nodes in the temporary DAG:
disconnect a pair of the connected nodes when the connected nodes are independent of one another; and
direct node edges of the disconnected nodes to a common neighbor node when the common neighbor node is not independent of the disconnected nodes.

* * * * *